United States Patent
Wang et al.

(10) Patent No.: US 10,580,436 B2
(45) Date of Patent: Mar. 3, 2020

(54) METHOD AND DEVICE FOR PROCESSING SPEECH BASED ON ARTIFICIAL INTELLIGENCE

(71) Applicant: BAIDU ONLINE NETWORK TECHNOLOGY (BEIJING) CO., LTD, Beijing (CN)

(72) Inventors: Zhijian Wang, Beijing (CN); Sheng Qian, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 108 days.

(21) Appl. No.: 15/851,944

(22) Filed: Dec. 22, 2017

(65) Prior Publication Data

US 2018/0190314 A1 Jul. 5, 2018

(30) Foreign Application Priority Data

Dec. 29, 2016 (CN) .......................... 2016 1 1246698

(51) Int. Cl.
*G10L 25/78* (2013.01)
*G10L 19/00* (2013.01)
(Continued)

(52) U.S. Cl.
CPC ................ *G10L 25/78* (2013.01); *G06N 5/02* (2013.01); *G10L 19/00* (2013.01); *G10L 25/69* (2013.01); *G10L 2025/783* (2013.01)

(58) Field of Classification Search
CPC ......... G10L 15/00; G10L 15/04; G10L 15/08; G10L 25/00; G10L 25/27; G10L 25/78
See application file for complete search history.

(56) References Cited

U.S. PATENT DOCUMENTS 5,018,201 A * 5/1991 Sugawara ............... G10L 15/00
704/252
5,103,481 A * 4/1992 Iseda ....................... G10L 25/78
704/219

(Continued)

FOREIGN PATENT DOCUMENTS

KR 20030079515 10/2003

OTHER PUBLICATIONS

SIPO, First Office Action for CN Application No. 201611246698.0, dated Jul. 1, 2019.

*Primary Examiner* — Paras D Shah
(74) *Attorney, Agent, or Firm* — Hodgson Russ LLP

(57) ABSTRACT

The present disclosure provides a method and a device for processing a speech based on artificial intelligence. The method includes: grading a current frame included in a speech packet to be decoded by using an acoustic model to obtain a grading result; identifying whether the current frame is a quasi-silent frame according the grading result; and skipping the current frame and not decoding the current frame if the current frame is the quasi-silent frame. In the present disclosure, before the current frame included in the speech pocket to be decoded is decoded, it is identified whether to decode the current frame according to the grading result obtained with the acoustic model. When there is no need to decode the current frame, the current frame is skipped. Thus, a redundancy decoding may be avoided, a speed of decoding is improved and recognition of the speech packet to be decoded is expedited.

17 Claims, 6 Drawing Sheets

(51) Int. Cl.
   *G10L 25/69* (2013.01)
   *G06N 5/02* (2006.01)

(56) References Cited

U.S. PATENT DOCUMENTS

| | | | | |
|---|---|---|---|---|
| 5,794,189 | A * | 8/1998 | Gould | G10L 15/22 704/231 |
| 7,277,853 | B1 * | 10/2007 | Bou-Ghazale | G10L 25/87 704/248 |
| 9,437,186 | B1 * | 9/2016 | Liu | G10L 15/05 |
| 2006/0053009 | A1 * | 3/2006 | Jeong | G10L 15/30 704/234 |
| 2008/0120104 | A1 * | 5/2008 | Ferrieux | G10L 15/30 704/246 |
| 2011/0282666 | A1 * | 11/2011 | Washio | G10L 17/26 704/246 |
| 2013/0006630 | A1 * | 1/2013 | Hayakawa | G10L 17/26 704/239 |
| 2016/0379627 | A1 * | 12/2016 | Yassa | G10L 25/78 704/255 |
| 2017/0148444 | A1 * | 5/2017 | Bocklet | G10L 17/22 |
| 2017/0178623 | A1 * | 6/2017 | Shamir | G10L 15/04 |
| 2018/0061399 | A1 * | 3/2018 | Rose | G10L 15/04 |
| 2018/0090127 | A1 * | 3/2018 | Hofer | G10L 15/04 |

* cited by examiner first three frames    speech frame    quasi-silent frame    quasi-silent frame    last frame

METHOD AND DEVICE FOR PROCESSING SPEECH BASED ON ARTIFICIAL INTELLIGENCE

CROSS-REFERENCE TO RELATED APPLICATIONS

This application is based on and claims a priority to Chinese Patent Application Serial No. 201611246698.0, filed on Dec. 29, 2016, the entire content of which is incorporated herein by reference.

TECHNICAL FIELD

The present disclosure relates to the field of information processing technology, and more particularly, to a method and a device for processing a speech based on artificial intelligence.

BACKGROUND

Artificial Intelligence (AI for short) is a new technical science studying and developing theories, methods, techniques and application systems for simulating, extending and expanding human intelligence. The artificial intelligence is a branch of computer science, which attempts to know the essence of intelligence and to produce an intelligent robot capable of acting as a human. The researches in this field include robots, speech recognition, image recognition, natural language processing and expert systems, etc. The speech recognition is a most important aspect of the artificial intelligence.

At present, the speech recognition is performed mainly via a connectionist temporal classification (CTC for short). When a speech packet is decoded during a speech recognition process, in the related art, all frames included in the speech packet are decoded with a CTC speech recognition system. However, in practice, some frames included in the speech packet may carry no content. The frames carrying no content are generally silent frames. A process of decoding the silent frames via the CTC speech recognition system is redundancy.

SUMMARY

Embodiments of the present disclosure provide a method for processing a speech based on artificial intelligence. The method includes: grading a current frame included in a speech packet to be decoded by using an acoustic model to obtain a grading result; identifying whether the current frame is a quasi-silent frame according the grading result; and skipping the current frame and not decoding the current frame if the current frame is the quasi-silent frame.

Embodiments of the present disclosure provide a device for processing a speech based on artificial intelligence. The device includes: a processor; a memory, configured to store instructions executable by the processor; in which, the processor is configured to: grade a current frame included in a speech packet to be decoded by using an acoustic model to obtain a grading result; identify whether the current frame is a quasi-silent frame according the grading result; and skip the current frame and not decode the current frame if the current frame is the quasi-silent frame.

Embodiments of the present disclosure provide a non-transitory computer storage medium. When instructions stored in the memory medium is executed by a processor of a server terminal, a method for processing a speech based on artificial intelligence may be executed by the server terminal. The method includes: grading a current frame included in a speech packet to be decoded by using an acoustic model to obtain a grading result; identifying whether the current frame is a quasi-silent frame according the grading result; and skipping the current frame and not decoding the current frame if the current frame is the quasi-silent frame.

Embodiments of the present disclosure provide a computer program product. When instructions in the computer program product are executed by a processor, a method for processing a speech is performed. The method includes: grading a current frame included in a speech packet to be decoded by using an acoustic model to obtain a grading result; identifying whether the current frame is a quasi-silent frame according the grading result; and skipping the current frame and not decoding the current frame if the current frame is the quasi-silent frame.

Additional aspects and advantages of embodiments of the present disclosure will be given in part in the following descriptions, become apparent in part from the following descriptions, or be learned from the practice of the embodiments of the present disclosure.

BRIEF DESCRIPTION OF THE DRAWINGS

The above and/or additional aspects and advantages of embodiments of the present disclosure will become apparent and more readily appreciated from the following descriptions made with reference to the drawings, in which.

DETAILED DESCRIPTION

Figure 1:
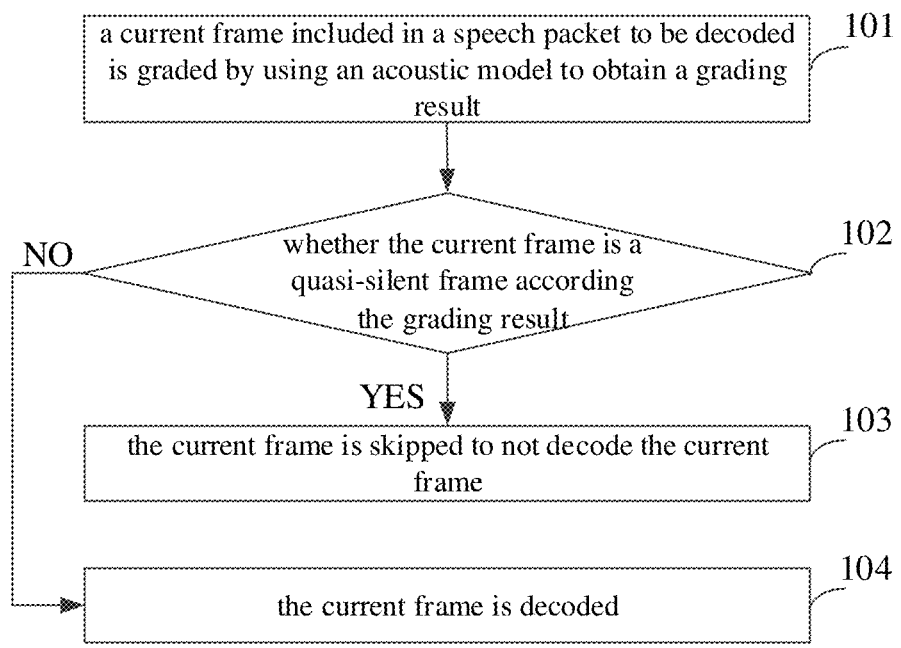
FIG. 1 is a flow chart illustrating a method for processing a speech based on artificial intelligence according to embodiments of the present disclosure.

Embodiments of the present disclosure will be described in detail and examples of embodiments are illustrated in the drawings. The same or similar elements and the elements having same or similar functions are denoted by like reference numerals throughout the descriptions. Embodiments described herein with reference to drawings are explanatory, serve to explain the present disclosure, and are not construed to limit embodiments of the present disclosure.

A method and a device for processing a speech based on artificial intelligence according to embodiments of the present disclosure will be described with reference to the drawings.

FIG. 1 is a flow chart illustrating a method for processing a speech based on artificial intelligence according to embodiments of the present disclosure. As illustrated in FIG. 1, the method includes followings.

At act S101, a current frame included in a speech packet to be decoded is graded by using an acoustic model to obtain a grading result.

In embodiments, the current frame included in the speech packet to be decoded may be graded by using the acoustic model to obtain the grading result. That is, an acoustic feature carried in the current frame is calculated by using the acoustic model to obtain posterior probabilities of hidden states corresponding to the acoustic feature. For example, when the acoustic feature carried in the current frame is a pronunciation, probable words corresponding to the pronunciation may be graded by using the acoustic model, to obtain posterior probabilities of the probable words corresponding to the pronunciation. Each of the probable words may be a hidden state.

At act S102, it is identified whether the current frame is a quasi-silent frame according the grading result.

In embodiments, if it is identified that the current frame is the quasi-silent frame, an act S103 is executed. And if it is identified that the current frame is not the quasi-silent frame, ac act S104 is executed.

Figure 2:
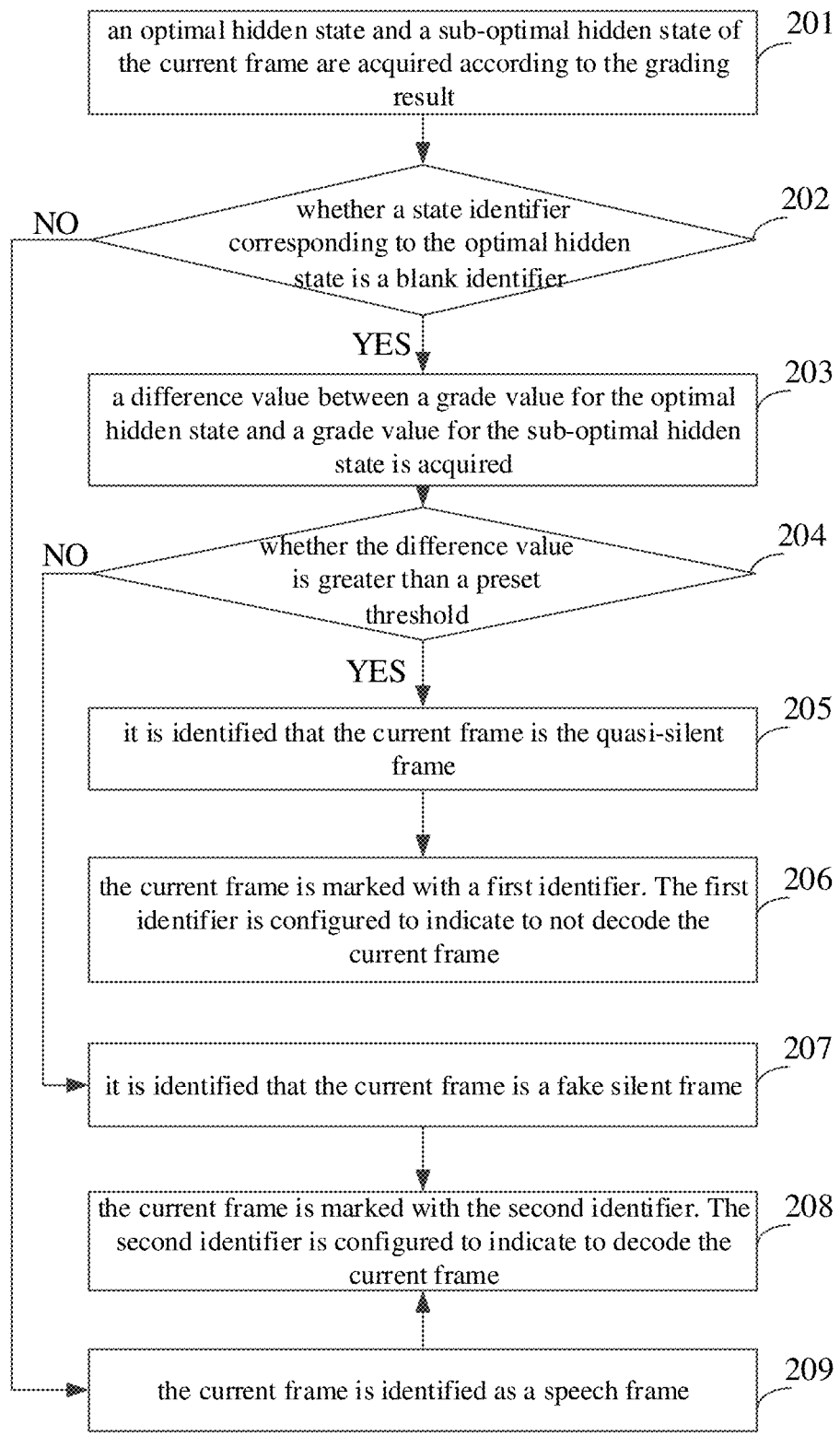
FIG. 2 is a flow chart illustrating a procedure for identifying a quasi-silent frame according to embodiments of the present disclosure.

FIG. 2 is a flow chart illustrating a procedure for identifying a quasi-silent frame according to embodiments of the present disclosure. In detail, the procedure for identifying the quasi-silent frame includes followings.

At act S201, an optimal hidden state and a sub-optimal hidden state of the current frame are acquired according to the grading result.

After the hidden states corresponding to the acoustic feature carried in the current frame are graded by using the acoustic model to obtain the grading result, the optimal hidden state and the sub-optimal hidden state of the current frame may be identified according to the grading result. For example, the optimal hidden state may be denoted as state A, and the sub-optimal hidden state may be denoted as state B.

At act S202, it is determined whether a state identifier corresponding to the optimal hidden state is a blank identifier.

In embodiments, during a process of training the acoustic feature in advance, one state identifier may be generated for each state corresponding to the acoustic feature. Further, some of the state identifiers may be identified as blank identifiers during the process of training the acoustic feature. In embodiments, a list or an associated relationship may be created previously with the state identifiers that are identified as the blank identifiers.

After the optimal hidden state (i.e. state A) is acquired, it is determined whether the state identifier corresponding to the optimal hidden state is the blank identifier. In detail, it may be inquired whether the state identifier corresponding to the state A is in the above list or the above associated relationship. If the state identifier is in the above list or the above associated relation, it may be determined that the state identifier corresponding to the state A is the blank identifier.

If it is determined that the state identifier corresponding to the optimal hidden state is the blank identifier, an act S203 is executed. And if it is determined that the state identifier corresponding to the optimal hidden state is not the blank identifier, an act S209 is executed.

At act S203, a difference value between a grade value for the optimal hidden state and a grade value for the sub-optimal hidden state is acquired.

In the embodiment, in order to avoid identifying the frame carrying less content as the silent frame, after determining that the state identifier corresponding to the state A is the blank identifier, the difference value between the grade value for the optimal hidden state and the grade value for the sub-optimal hidden state is acquired. In detail, the states of the acoustic feature may be graded by using the acoustic model to obtain the grade values. After it is determined that the state identifier corresponding to the state A is the blank identifier, the difference value may be obtained by performing a subtract operation between the grade value for the state A and the grade value for the state B. The grade value of each state is the posterior probability of each state.

At act S204, it is determined whether the difference value is greater than a preset threshold.

In embodiments, the preset threshold is defined previously. After the difference value is acquired, the difference value may be compared with the preset threshold to determine whether the current frame is quasi-silent frame.

If the difference value is greater than the preset threshold, an act S205 is executed. And if the difference value is smaller than or equal to the preset threshold, an act S207 is executed.

At act S205, it is identified that the current frame is the quasi-silent frame.

In practice, if the difference value is greater than the preset threshold, it may be illustrated that a difference between the state A and the state B is relatively great. That is, a probability of identifying the current frame as the state B is significantly low, thus the current frame is identified as the quasi-silent frame.

At act S206, the current frame is marked with a first identifier. The first identifier is configured to indicate to not decode the current frame.

In embodiments, there are two identifiers for the current frame preset, one is the first identifier and another is a second identifier. The first identifier is configured to indicate that there is no need to decode the current frame during a decoding. And the second identifier is configured to indicate that there is a need to decode the current frame during the decoding.

After the current frame is identified as the quasi-silent frame, the current frame may be marked with the first identifier. When the current frame is to be decoded, it may be determined whether to decode the current frame according to the identifier of the current frame. Here, the identifier of the current frame is the first identifier, and then the current frame is not decoded and is skipped.

At act S207, it is identified that the current frame is a fake silent frame.

In practice, if the difference value is smaller than or equal to the preset threshold, it may be illustrated that a difference between the state A and the state B is small. That is, a probability of identifying the current frame as the state B is relatively high. Speeches may be carried in the current frame and thus the current frame is identified as the fake silent frame.

At act S208, the current frame is marked with the second identifier. The second identifier is configured to indicate to decode the current frame.

After the current frame is identified as the fake silent speech, the current frame may be marked with the second identifier. When the current frame is to be decoded, it may be determined whether to decode the current frame according to the identifier of the current frame. Here, the identifier of the current frame is the second identifier, and then the current frame needs to be decoded.

At act S209, the current frame is identified as a speech frame.

In embodiments, a list or an associated relation may be created previously by using the state identifiers that are identified as the blank identifiers. It may be inquired whether the state identifier corresponding to state A is in the above list or the above associated relation. If it is inquired that there is no the state identifier corresponding to the state A in the above list or the above associated relation, it may be determined that the state identifier corresponding to the state A is not the blank identifier. Meanwhile, the current frame may be identified as the speech frame.

Further, after the current frame is identified as the speech frame, it is illustrated that it needs to decode the current frame to acquire content carried in the speech frame. In embodiments, after the current frame is identified as the speech frame, the current frame may be marked with the second identifier, that is, an act S208 is executed. When the current frame is to be decoded, it may be determined whether to decode the current frame according to the identifier of the current frame. Here, the identifier of the current frame is the second identifier, and it may be determined that there is a need to decode the current frame.

At act S103, the current frame is skipped to not decode the current frame.

In embodiments, the current frame is identified as the quasi-silent frame, that is, no relevant content is carried in the current frame or even no content is carried in the current frame. Therefore, the current frame may be skipped and may be not decoded. Thus, a speed of decoding may be improved and recognition of the speech packed may be expedited.

At act S104, the current frame is decoded.

In embodiments, it is identified that the current frame is not the quasi-silent frame. That is, certain speeches are carried in the current frame. In order to ensure that the content decoded has no distortion, it needs to decode the current frame.

With the method according to embodiments of the present disclosure, by grading the current frame included in the speech packet to be decoded by using the acoustic model to obtain the grading result, and by identifying whether the current frame is the quasi-silent frame according to the grading result, the current frame is skipped if the current frame is the quasi-silent frame. In the embodiment, before the current frame included in the speech pocket to be decoded is decoded, it is identified whether to decode the current frame according to the grading result obtained with the acoustic model. When there is no need to decode the current frame, the current frame is skipped. Thus, a redundancy decoding may be avoided, a speed of decoding is improved and recognition of the speech packet to be decoded is expedited.

Figure 3:
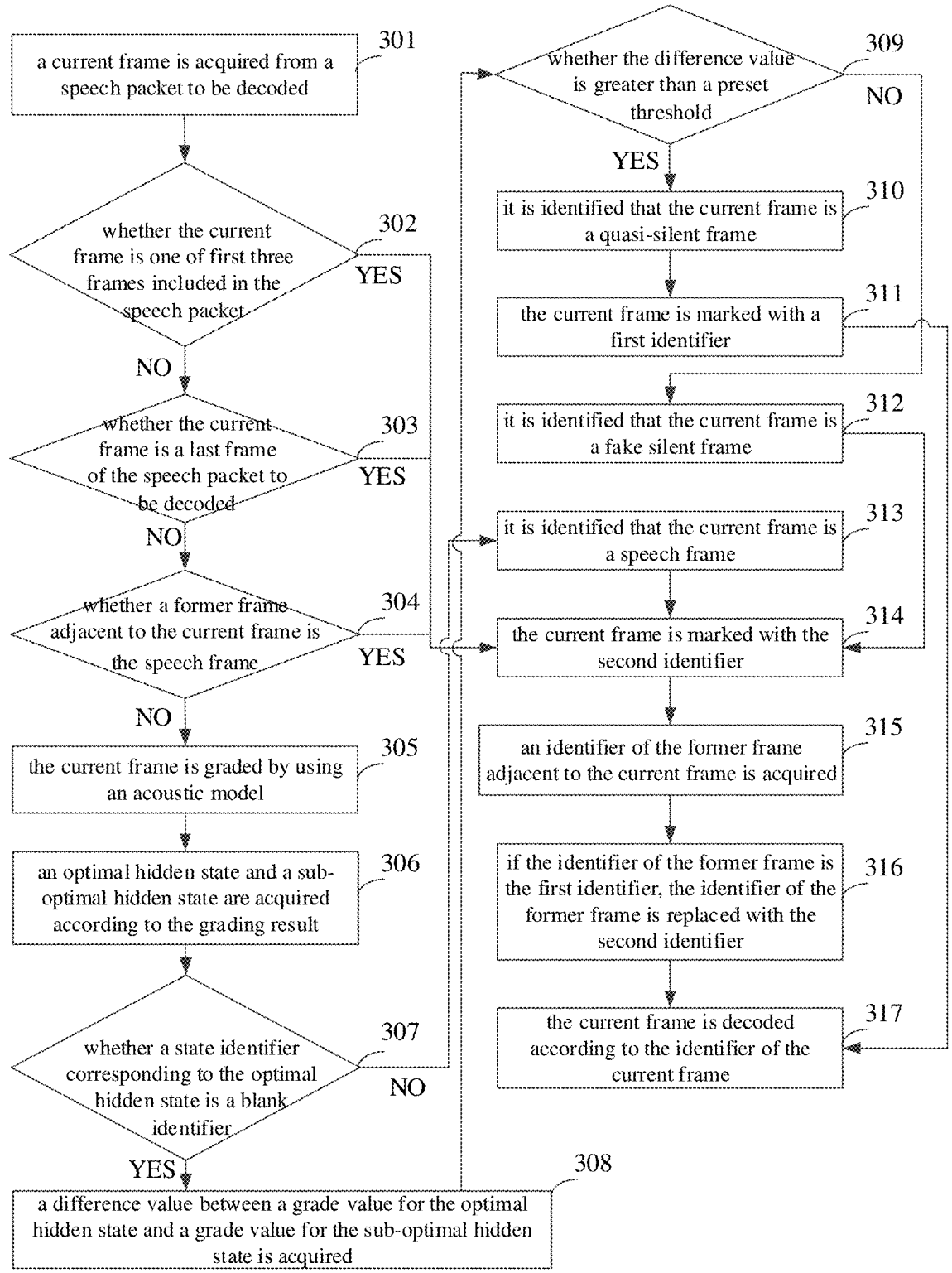
FIG. 3 is a flow chart illustrating another method for processing a speech based on artificial intelligence according to embodiments of the present disclosure.

FIG. 3 is a flow chart illustrating another method for processing a speech based on artificial intelligence according to embodiments of the present disclosure. As illustrated in FIG. 3, the method includes followings.

At act S301, a current frame is acquired from a speech packet to be decoded.

At act S302, it is judged whether the current frame is one of first three frames included in the speech packet.

After the current frame is acquired from the speech packet to be decoded, it is judged whether the current frame is one of the first three frames of the speech packet to be decoded. In detail, the frames in the speech packet to be decoded may be counted according to the time sequence. The serial number counted may be obtained for the current frame. It may be judged whether the current frame is one of the first three frames of the speech packet according to the serial number counted.

If it is judged that the current frame is not one of the first three frames of the speech packet to be decoded, an act S303 is executed. And if it is judged that the current frame is one of the first three frames of the speech packet to be decoded, an act S314 is executed to mark the current frame with a second identifier.

In embodiments, in order to successfully input the speech packet to be decoded into a decoder, it needs to decode the first three frames of the speech packet. The current frame is marked with the second identifier when it is judged that the current frame is one of the first three frames of the speech packet. After the second identifier is identified, the current frame is decoded.

At act S303, it is judged whether the current frame is a last frame of the speech packet to be decoded.

If it is judged that the current frame is not the last frame of the speech packet, an act S304 is executed. And if it is judged that the current frame is the last frame of the speech packet. An act S314 is executed to mark the current frame with the second identifier.

In practice, when the first frame of a next speech packet to be decoded is a speech frame, in order to actually reflect content carried in the speech frames, it needs to decode the last frame of a current speech packet to be decoded. After it is judged that the current frame is not one of the first three frames of the current speech packet to be decoded, it is further judged whether the current frame is the last frame of the current speech packet to be decoded. In detail, the number of frames included in the current speech packet to be decoded may be acquired previously, and it may be determined whether the current frame is the last frame according to the serial number counted. Alternatively, if a poster frame may be acquired after the current frame is acquired, then it may be determined that the current frame is not the last frame. Alternatively, an end identifier at the end of the speech packet may be carried in the speech packet. If the end identifier is carried in the current frame acquired, it may be determined that the current frame is the last frame.

If the first frame of the next speech packet to be decoded is the speech frame, in order to actually reflect the content carried in the speech frames, it needs to decode the last frame of the current speech packet to be decoded. In the embodiment, the current frame is marked with the second identifier. After the second identifier is identified, the current frame is decoded.

At act S304, it is judged whether a former frame adjacent to the current frame is the speech frame.

In embodiments, in order to actually reflect the content carried in the speech frames, it also needs to judge whether the former frame adjacent to the current frame is the speech frame when the current frame is graded by using the acoustic model. If it is judged that the former frame adjacent to the current frame is not the speech frame, an act S305 is executed. And if the former frame is the speech frame, an act S314 is executed to mark the current frame with the second identifier.

Generally, when a frame is the speech frame, the former frame and the poster frame of the speech frame are correlated to the speech frame. When the speech frame is decoded, there is a need to decode the former frame adjacent to the speech frame and the poster frame adjacent to the speech frame.

At act S305, the current frame is graded by using an acoustic model to obtain a grading result.

Details may be referred to the description of the above embodiments, which are not elaborated herein.

At act S306, an optimal hidden state and a sub-optimal hidden state are acquired according to the grading result.

At act S307, it is judged whether a state identifier corresponding to the optimal hidden state is a blank identifier.

If it is judged that the state identifier corresponding to the optimal hidden state is the blank identifier, an act S308 is executed. And if it is judged that the state identifier corresponding to the optimal hidden state is not the blank identifier, an act S313 is executed.

At act S308, a difference value between a grade value for the optimal hidden state and a grade value for the sub-optimal hidden state is acquired.

At act S309, it is judged whether the difference value is greater than a preset threshold.

If it is judged that the difference value is greater than the preset threshold, an act S310 is executed. And if it is judged that the difference value is smaller than or equal to the preset threshold, an act S312 is executed.

Details of acts S306-S309 may be referred to the description of the above embodiments, which are not elaborated herein.

At act S310, it is identified that the current frame is a quasi-silent frame.

At act S311, the current frame is marked with a first identifier.

Further, after the quasi-silent frame is marked with the first identifier, an act S317 may be executed. That is, it is determined whether to decode the current frame according to the identifier of the current frame.

At act S312, it is identified that the current frame is a fake silent frame.

When the current frame is identified as the fake silent frame, an act S314 is executed.

At S313, it is identified that the current frame is a speech frame.

When it is judged that the state identifier corresponding to the optimal hidden state is not the blank identifier in the act S307, an act S313 is executed and an act S314 is sequentially executed.

At act S314, the current frame is marked with the second identifier.

After the current frame that is identified as the speech frame is marked with the second identifier, an act S315 is executed.

At act S315, an identifier of the former frame adjacent to the current frame is acquired.

At act S316, if the identifier of the former frame is the first identifier, the identifier of the former frame is replaced with the second identifier.

When the current frame is the speech frame, in order to actually reflect content carried in the speech frames, it needs to decode the former frame adjacent to the current frame and the poster frame adjacent to the current frame. In embodiments, as the poster frame adjacent to the current frame may be regarded as a next current frame again after the current frame is processed, and the act S304 may be executed (that is, it may be judged whether a former frame adjacent to that poster frame (i.e. the current frame) is the speech frame) during a procedure of processing that poster frame (that is, the next current frame), that poster frame is marked with the second identifier if the current frame is the speech frame. Therefore, in embodiments, it only needs to adjust the identifier of the former frame adjacent to the current frame. That is, when the identifier of the former frame adjacent to the current frame acquired is the first identifier, the identifier is placed with the second identifier. Thus, when the decoding proceeds to the former frame, the former frame is decoded, such that actual content carried in the speech packet may be decoded if the current frame is the speech frame. In embodiments, when the current frame is the speech frame, it needs to decode the former frame adjacent to the current frame and the poster frame adjacent to the speech frame, to decode the actual content carried in the speech packet.

Figure 4:
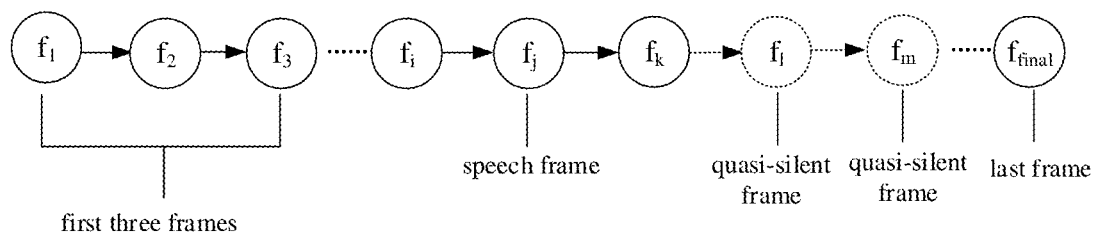
FIG. 4 is a schematic diagram illustrating a speech packet to be decoded in which frames included are being decoded according to embodiments of the present disclosure.

FIG. 4 is a schematic diagram illustrating a speech packet to be decoded in which frames included are being decoding accorded to embodiments of the present disclosure. As illustrated in FIG. 4, the dashed line denotes that a frame is skipped, and the solid line denotes that a frame is not skipped. The first three frames $f_1$-$f_3$ of the speech packet to be decoded need to be decoded. If $f_j$ is the speech frame, the former frame $f_i$ adjacent to the speech frame and the poster frame $f_k$ adjacent to the speech frame need to be decoded. $f_l$ and $f_m$ each are quasi-silent frames, which need to be skipped until there is a frame of which the identifier is the second identifier, then the frame is decoded. When the decoding proceeds to the last frame, it needs to decode the last frame $f_{final}$. As seen from the schematic diagram, when the speech packet to be decoded is decoded, the quasi-silent frame may be skipped. Thus, the decoding may be expedited and a speed of speech recognition is improved.

Figure 5:
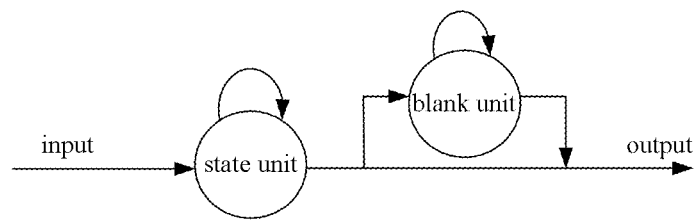
FIG. 5 is a topology diagram of a CTC modeling unit according to embodiments of the present disclosure.

FIG. 5 is a topology diagram of a CTC modeling unit according to embodiments of the present disclosure. In the topology diagram, a state unit and a blank unit are included. The state unit includes remaining states besides blank states identified. The blank state is a state corresponding to the marked blank identifier.

After the speech packet to be decoded is inputted into the CTC modeling unit, the result may be output directly via the state unit, or may be output via the blank unit after the state unit. If there are same states in series in the speech packet, the same states may be self-skipped in the state unit. If there are blank states in series in the speech packet, the blank states may be self-skipped in the blank unit.

Figure 6:
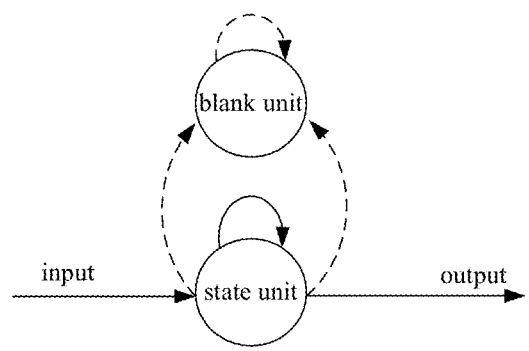
FIG. 6 is a topology diagram of another CTC modeling unit according to embodiments of the present disclosure.

FIG. 6 is a topology diagram of another CTC modeling unit according to embodiments of the present disclosure. The topology diagram illustrated in FIG. 6 is equivalent to the topology diagram illustrated in FIG. 5. As the blank unit is null, that is, the blank unit has no physical meaning (the blank unit is introduced forcibly), as illustrated in FIG. 6, the blank unit denoted by the dashed line may be removed. That is, the blank state corresponding to the blank unit is also set in the state unit. Then when there is the blank state, the result may be directly output via the state unit. The same states in series and the blank states in series may be self-skipped in the state unit.

At act S317, the current frame is decoded according to the identifier of the current frame.

Specifically, if the identifier of the current frame is the first identifier, the current frame is skipped. That is, the current frame is not decoded. If the identifier of the current frame is the second identifier, the current frame is decoded.

With the method according to embodiments of the present disclosure, by grading the current frame included in the speech packet to be decoded by using the acoustic model to obtain the grading result, and by identifying whether the current frame is the quasi-silent frame according to the grading result, the current frame is skipped if the current frame is the quasi-silent frame. In embodiments, before the current frame included in the speech pocket to be decoded is decoded, it is identified whether to decode the current frame according to the grading result obtained with the acoustic model. When there is no need to decode the current frame, the current frame is skipped. Thus, a redundancy decoding may be avoided, a speed of decoding is improved and an recognition of the speech packet to be decoded is expedited. Further, when the current frame is the speech frame, the former frame adjacent to the current frame and the poster frame adjacent to the current frame need to be decoded. Thus, actual content carried in the speech packet may be reflected.

Figure 7:
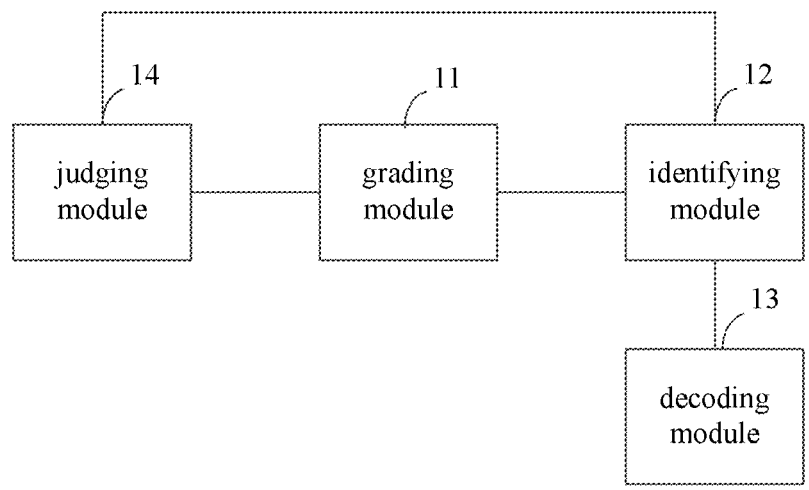
FIG. 7 is a block diagram illustrating a device for processing a speech based on artificial intelligence according to embodiments of the present disclosure.

FIG. 7 is a block diagram illustrating a device for processing a speech based on artificial intelligence according to embodiments of the present disclosure. As illustrated in FIG. 7, the device includes: a grading module 11, an identifying module 12 and a decoding module 13.

The grading module 11 is configured to grade a current frame included in a speech packet to be decoded by using an acoustic model to obtain a grading result.

The identifying module 12 is configured to identify whether the current frame is a quasi-silent frame according to a grading result.

The decoding module 13 is configured to skip the current frame and not to decode the current frame if the current frame is the quasi-silent frame.

Figure 8:
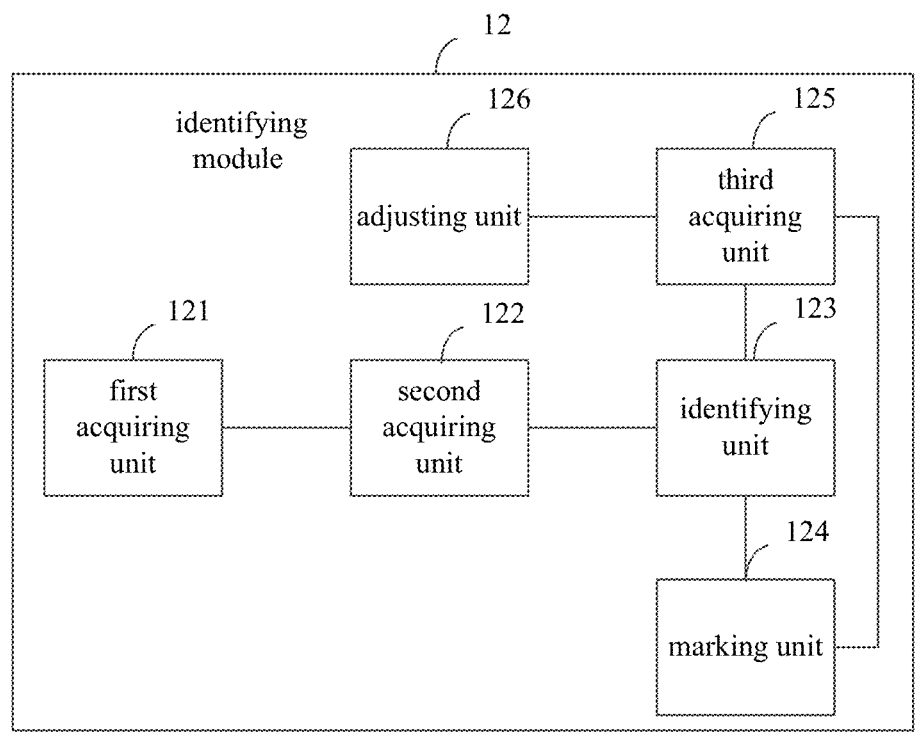
FIG. 8 is a block diagram illustrating an identifying module according to embodiments of the present disclosure.

FIG. 8 is a block diagram illustrating an identifying module according to embodiments of the present disclosure. As illustrated in FIG. 8, the identifying module 12 includes: a first acquiring unit 121, a second acquiring unit 122, an identifying unit 123 and a marking unit 124.

The first acquiring unit 121 is configured to acquire an optimal hidden state and a sub-optimal hidden state of the current frame according to the grading result.

The second acquiring unit 122 is configured to acquire a difference value between a grade value for the optimal hidden state and a grade value for the sub-optimal hidden state if a state identifier corresponding to the optimal hidden state is a blank identifier.

The identifying unit 123 is configured to identify the current frame as the quasi-silent frame if the difference value is greater than a preset threshold.

The marking unit 124 is configured to mark the current frame with a first identifier, in which the first identifier is configured to indicate to not decode the current frame.

Further, the identifying unit 123 is also configured to identify the current frame as a fake silent frame if the difference value is smaller than or equal to the preset threshold.

The marking unit 124 is also configured to mark the current frame with a second identifier, in which the second identifier is configured to indicate to decode the current frame.

Further, the identifying unit 123 is also configured to identify the current frame as a speech frame if the state identifier corresponding to the optimal hidden state is not the blank identifier.

The marking unit 124 is also configured to mark the current frame with the second identifier.

Figure 9:
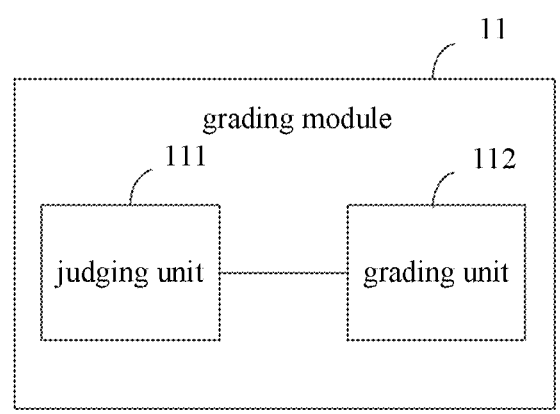
FIG. 9 is a block diagram illustrating a grading module according to embodiments of the present disclosure.

FIG. 9 is a block diagram illustrating a grading module according to embodiments of the present disclosure. As illustrated in FIG. 9, the grading module 11 includes: a judging unit 111 and a grading unit 112.

The judging unit 111 is configured to judge whether a former frame adjacent to the current frame is the speech frame.

The grading unit 112 is configured to grade the current frame by using the acoustic model if the former frame is not the speech frame.

The marking unit 124 is further configured to mark the current frame with the second identifier if the former frame is the speech frame.

Further, the identifying module 12 also includes a third acquiring unit 125 and an adjusting unit 126.

The third acquiring unit 125 is configured to acquire an identifier corresponding to the former frame after the current frame is identified as the speech frame if the state identifier corresponding to the optimal hidden state is not the blank identifier.

The adjusting unit 126 is configured to re-mark the previous frame with the second identifier if the identifier corresponding to the former frame is the first identifier.

Further, the method also includes: a judging module 14.

The judging module 14 is configured to judge whether the current frame is one of first three frames included in the speech packet and to judge whether the current frame is a last frame comprised in speech packet if the current frame is not one of first three frames.

The marking unit 124 is configured to mark the current frame with the second identifier, if the current frame is one of the first three frames or the current frame is the last frame; in which the second identifier is configured to indicate to decode the current frame.

With the device according to the embodiments of the present disclosure, by grading the current frame included in the speech packet to be decoded by using the acoustic model to obtain the grading result, and by identifying whether the current frame is the quasi-silent frame according to the grading result, the current frame is skipped if the current frame is the quasi-silent frame. In embodiments, before the current frame included in the speech pocket to be decoded is decoded, it is identified whether to decode the current frame according to the grading result obtained with the acoustic model. When there is no need to decode the current frame, the current frame is skipped. Thus, a redundancy decoding may be avoided, a speed of decoding is improved and an recognition of the speech packet to be decoded is expedited. Further, when the current frame is the speech frame, the former frame adjacent to the current frame and the poster frame adjacent to the current frame need to be decoded. Thus, actual content carried in the speech packet may be reflected.

In the description of the present disclosure, reference throughout this specification to "an embodiment," "some embodiments," "example," "a specific example," or "some examples," means that a particular feature, structure, material, or characteristic described in connection with the embodiment or example is included in at least one embodiment or example of the present disclosure. In the specification, the terms mentioned above are not necessarily referring to the same embodiment or example of the present disclosure. Furthermore, the particular features, structures, materials, or characteristics may be combined in any suitable manner in one or more embodiments or examples. Besides, any different embodiments and examples and any different characteristics of embodiments and examples may be combined by those skilled in the art without contradiction.

In addition, terms such as "first" and "second" are used herein for purposes of description and are not intended to indicate or imply relative importance or significance. Furthermore, the feature defined with "first" and "second" may comprise one or more this feature distinctly or implicitly. In the description of the present disclosure, "a plurality of" means two or more than two, unless specified otherwise.

Any procedure or method described in the flow charts or described in any other way herein may be understood to comprise one or more modules, portions or parts for storing executable codes that realize particular logic functions or procedures. Moreover, advantageous embodiments of the present disclosure comprises other implementations in which the order of execution is different from that which is depicted or discussed, including executing functions in a substantially simultaneous manner or in an opposite order according to the related functions, which should be understood by those skilled in the art.

The logic and/or steps described in other manners herein or illustrated in the flow chart, for example, a particular sequence table of executable instructions for realizing the logical function, may be specifically achieved in any computer readable medium to be used by the instruction execution system, device or equipment (such as the system based on computers, the system comprising processors or other systems capable of obtaining the instruction from the instruction execution system, device and equipment and executing the instruction), or to be used in combination with the instruction execution system, device and equipment. As to the specification, "the computer readable medium" may be any device adaptive for including, storing, communicating, propagating or transferring programs to be used by or in combination with the instruction execution system, device or equipment. More specific examples of the computer readable medium comprise but are not limited to: an electronic connection (an electronic device) with one or more wires, a portable computer enclosure (a magnetic device), a random access memory (RAM), a read only memory (ROM), an erasable programmable read-only memory (EPROM or a flash memory), an optical fiber device and a portable compact disk read-only memory (CDROM). In addition, the computer readable medium may even be a paper or other appropriate medium capable of printing programs thereon, this is because, for example, the paper or other appropriate medium may be optically scanned and then edited, decrypted or processed with other appropriate methods when necessary to obtain the programs in an electric manner, and then the programs may be stored in the computer memories.

It should be understood that each part of the present disclosure may be realized by the hardware, software, firmware or their combination. In the above embodiments, a plurality of steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

Those skilled in the art shall understand that all or parts of the steps in the above exemplifying method of the present disclosure may be achieved by commanding the related hardware with programs. The programs may be stored in a computer readable storage medium, and the programs comprise one or a combination of the steps in the method embodiments of the present disclosure when run on a computer.

In addition, each function cell of the embodiments of the present disclosure may be integrated in a processing module, or these cells may be separate physical existence, or two or more cells are integrated in a processing module. The integrated module may be realized in a form of hardware or in a form of software function modules. When the integrated module is realized in a form of software function module and is sold or used as a standalone product, the integrated module may be stored in a computer readable storage medium.

The storage medium mentioned above may be read-only memories, magnetic disks or CD, etc. Although explanatory embodiments have been illustrated and described, it would be appreciated by those skilled in the art that the above embodiments are exemplary and cannot be construed to limit the present disclosure, and changes, modifications, alternatives and varieties can be made in the embodiments by those skilled in the art without departing from scope of the present disclosure.

What is claimed is:

1. A method for processing a speech based on artificial intelligence, comprising:
    grading, by at least one computing device, a current frame comprised in a speech packet to be decoded by using an acoustic model to obtain a grading result;
    identifying, by the at least one computing device, whether the current frame is a quasi-silent frame according the grading result; and
    skipping, by the at least one computing device, the current frame and not decoding, by the at least one computing device, the current frame if the current frame is the quasi-silent frame;
    wherein identifying, by the at least one computing device, whether the current frame is a quasi-silent frame according the grading result comprises:
        acquiring, by the at least one computing device, an optimal hidden state and a sub-optimal hidden state of the current frame according to the grading result;
        acquiring, by the at least one computing device, a difference value between a grade value for the optimal hidden state and a grade value for the sub-optimal hidden state if a state identifier corresponding to the optimal hidden state is a blank identifier;
        identifying, by the at least one computing device, the current frame as the quasi-silent frame if the difference value is greater than a preset threshold; and
        marking, by the at least one computing device, the current frame in a first identifier, wherein the first identifier is configured to indicate to not decode the current frame.

2. The method according to claim 1, further comprising:
    identifying, by the at least one computing device, the current frame as a fake silent frame if the difference value is smaller than or equal to the preset threshold; and
    marking, by the at least one computing device, the current frame with a second identifier, wherein the second identifier is configured to indicate to decode the current frame.

3. The method according to claim 2, further comprising:
    identifying, by the at least one computing device, the current frame as a speech frame if the state identifier corresponding to the optimal hidden state is not the blank identifier; and
    marking, by the at least one computing device, the current frame with the second identifier.

4. The method according to claim 3, wherein grading, by the at least one computing device, a current frame comprised in a speech packet to be decoded by using an acoustic model comprises:

judging, by the at least one computing device, whether a former frame adjacent to the current frame is the speech frame;
marking, by the at least one computing device, the current frame with the second identifier if the former frame is the speech frame; and
grading, by the at least one computing device, the current frame by using the acoustic model if the former frame is not the speech frame.

5. The method according to claim 4, after identifying, by the at least one computing device, the current frame as the speech frame if the state identifier corresponding to the optimal hidden state is not the blank identifier, further comprising:
acquiring, by the at least one computing device, an identifier corresponding to the former frame; and
re-marking, by the at least one computing device, the former frame with the second identifier if the identifier corresponding to the former frame is the first identifier.

6. The method according to claim 1, before grading, by the at least one computing device, the current frame comprised in the speech packet to be decoded by using the acoustic model, comprising:
judging, by the at least one computing device, whether the current frame is one of first three frames of the speech packet;
marking, by the at least one computing device, the current frame with a second identifier if the current frame is one of the first three frames, wherein the second identifier is configured to indicate to decode the current frame;
judging, by the at least one computing device, whether the current frame is a last frame comprised in the speech packet if the current frame is not one of first three frames; and
marking, by the at least one computing device, the current frame with the second identifier if the current frame is the last frame.

7. A device for processing a speech based on artificial intelligence, comprising:
a processor; and
a memory, configured to store instructions executable by the processor, wherein the processor is configured to:
grade a current frame comprised in a speech packet to be decoded by using an acoustic model to obtain a grading result;
identify whether the current frame is a quasi-silent frame according the grading result; and
skip the current frame and not decode the current frame if the current frame is the quasi-silent frame
wherein the processor is configured to identify whether the current frame is a quasi-silent frame according the grading result by acts of:
acquiring an optimal hidden state and a sub-optimal hidden state of the current frame according to the grading result
acquiring a difference value between a grade value for the optimal hidden state and a grade value for the sub-optimal hidden state if a state identifier corresponding to the optimal hidden state is a blank identifier;
identifying the current frame as the quasi-silent frame if the difference value is greater than a preset threshold; and
marking the current frame in a first identifier, wherein the first identifier is configured to indicate to not decode the current frame.

8. The device according to claim 7, wherein the processor is further configured to:
identify the current frame as a fake silent frame if the difference value is smaller than or equal to the preset threshold; and
mark the current frame with a second identifier, wherein the second identifier is configured to indicate to decode the current frame.

9. The device according to claim 8, wherein the processor is further configured to:
identify the current frame as a speech frame if the state identifier corresponding to the optimal hidden state is not the blank identifier; and
mark the current frame with the second identifier.

10. The device according to claim 9, wherein the processor is configured to grade a current frame comprised in a speech packet to be decoded by using an acoustic model by acts of:
judging whether a former frame adjacent to the current frame is the speech frame;
marking the current frame with the second identifier if the former frame is the speech frame; and
grading the current frame by using the acoustic model if the former frame is not the speech frame.

11. The device according to claim 10, wherein the processor is further configured to:
acquire an identifier corresponding to the former frame; and
re-mark the former frame with the second identifier if the identifier corresponding to the former frame is the first identifier.

12. The device according to claim 7, wherein the processor is further configured to:
judge whether the current frame is one of first three frames of the speech packet;
mark the current frame with a second identifier if the current frame is one of the first three frames, wherein the second identifier is configured to indicate to decode the current frame;
judge whether the current frame is a last frame comprised in the speech packet if the current frame is not one of first three frames; and
mark the current frame with the second identifier if the current frame is the last frame.

13. A non-transitory computer readable storage medium comprising instructions, wherein when the instructions are executed by a processor of a device to perform acts of:
grading a current frame comprised in a speech packet to be decoded by using an acoustic model to obtain a grading result;
identifying whether the current frame is a quasi-silent frame according the grading result; and
skipping the current frame and not decoding the current frame if the current frame is the quasi-silent frame,
wherein identifying whether the current frame is a quasi-silent frame according the grading result comprises:
acquiring an optimal hidden state and a sub-optimal hidden state of the current frame according to the grading result
acquiring a difference value between a grade value for the optimal hidden state and a grade value for the sub-optimal hidden state if a state identifier corresponding to the optimal hidden state is a blank identifier;
identifying the current frame as the quasi-silent frame if the difference value is greater than a preset threshold; and marking the current frame in a first identifier, wherein the first identifier is configured to indicate to not decode the current frame.

14. The non-transitory computer readable storage medium claim 13, wherein when the instructions are executed by a processor of a device to perform further acts of:
identifying the current frame as a fake silent frame if the difference value is smaller than or equal to the preset threshold; and
marking the current frame with a second identifier, wherein the second identifier is configured to indicate to decode the current frame.

15. The non-transitory computer readable storage medium claim 14, wherein when the instructions are executed by a processor of a device to perform further acts of:
identifying the current frame as a speech frame if the state identifier corresponding to the optimal hidden state is not the blank identifier; and
marking the current frame with the second identifier.

16. The non-transitory computer readable storage medium claim 15, wherein grading a current frame comprised in a speech packet to be decoded by using an acoustic model comprises:
judging whether a former frame adjacent to the current frame is the speech frame;
marking the current frame with the second identifier if the former frame is the speech frame; and
grading the current frame by using the acoustic model if the former frame is not the speech frame.

17. The non-transitory computer readable storage medium claim 16, wherein when the instructions are executed by a processor of a device to perform further acts of:
acquiring an identifier corresponding to the former frame; and
re-marking the former frame with the second identifier if the identifier corresponding to the former frame is the first identifier.

\* \* \* \* \*